United States Patent
Hlubina et al.

(10) Patent No.: US 8,038,203 B2
(45) Date of Patent: Oct. 18, 2011

(54) MOTOR VEHICLE FLOOR COMPRISING LOCALLY REINFORCED RAILS

(75) Inventors: Thierry Hlubina, Chaville (FR); Christian Delord, Pavillons Sous Bois (FR); Francois Vivero, Le Chesnay (FR)

(73) Assignee: Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 12/739,814

(22) PCT Filed: Sep. 30, 2008

(86) PCT No.: PCT/FR2008/051762
§ 371 (c)(1),
(2), (4) Date: Sep. 15, 2010

(87) PCT Pub. No.: WO2009/053569
PCT Pub. Date: Apr. 30, 2009

(65) Prior Publication Data
US 2011/0043000 A1    Feb. 24, 2011

(30) Foreign Application Priority Data
Oct. 26, 2007    (FR) ..................... 07 07542

(51) Int. Cl.
*B60J 7/00*    (2006.01)
(52) U.S. Cl. .................. 296/193.07; 296/204

(58) Field of Classification Search ............ 296/29, 296/30, 193.07, 203.01, 203.02, 204, 209
See application file for complete search history.

(56) References Cited

U.S. PATENT DOCUMENTS

| 2,710,222 A | 6/1955 | Barenyi |
| 5,125,715 A | 6/1992 | Kijima |
| 5,562,329 A | 10/1996 | Srock et al. |
| 5,713,625 A | 2/1998 | Takahashi et al. |
| 5,882,065 A | 3/1999 | Koiwa et al. |

FOREIGN PATENT DOCUMENTS

| EP | 0 421 277 | 4/1991 |
| EP | 0 693 414 | 1/1996 |

*Primary Examiner* — Lori Lyjak
(74) *Attorney, Agent, or Firm* — Oblon, Spivak, McClelland, Maier & Neustadt, L.L.P.

(57) ABSTRACT

The invention relates to an automobile floor (1) that comprises two rails (2) symmetrically arranged relative to the longitudinal axis of the vehicle, each rail (2) including two metal sheets (3) having a U section and superimposed in order to define a hollow body, one of the metal sheets (3) having a U section extending under the floor (1) while the other metal sheet extends above the floor (1), the ends of the side flanges of each of the metal sheets (3) having a U section being welded to the metal sheet of the floor (1), and each rail (2) including a bent area (2a), characterised in that the upper base (3a) of the U section of the metal sheet (3) extending above the floor (1) includes, in the bent area (2a) and solely in said bent area (2a), at least one reinforcement rib (5) obtained by folding said metal sheet (3).

7 Claims, 1 Drawing Sheet

MOTOR VEHICLE FLOOR COMPRISING LOCALLY REINFORCED RAILS

BACKGROUND

The invention relates to a motor vehicle floor comprising two rails arranged symmetrically with respect to the longitudinal axis of the vehicle.

In known constructions, each rail consists of two U-section plates superposed to form a hollow body, one of the U-section plates being beneath the floor and the other plate being above the floor and the edges of the lateral flanges of each of the U-section plates being welded to the plate of the floor, each rail comprising a bent region.

This bent region is usually situated at the front of the rail in the upwardly curved intermediate region between the floor and the bulkhead of the vehicle.

This region experiences high stresses particularly in a front impact of the vehicle.

To enable the rails to withstand the stresses, one known solution is to use a relatively large plate thickness for the two U-section plates.

This solution however, has the disadvantage of increasing the mass and cost of the rails and therefore of the vehicle.

BRIEF SUMMARY

The object of the present invention is to solve the disadvantages of the foregoing solutions.

This object is achieved according to the invention with a motor vehicle floor comprising two rails arranged symmetrically with respect to the longitudinal axis of the vehicle, each rail consisting of two U-section plates superposed to form a hollow body, one of the U-section plates being beneath the floor and the other plate being above the floor and the edges of the lateral flanges of each of the U-section plates being welded to the plate of the floor, each rail comprising a bent region, characterized in that the upper base of the U-section of the plate above the floor has, in the bent region and only in this region, at least one reinforcing rib.

The reinforcing rib may for example be made by bending the plate.

The rib is thus located only in the bent region, which is that which receives the greatest stresses.

This arrangement makes it possible both to reduce the thickness of the rail plate and the mass, since the developed surface of the plate is increased in only a reduced portion of the length of the rail.

The base of the upper U-section plate of the rail preferably has two longitudinal ribs in said bent region.

In one embodiment, the two ribs are situated one on each of the two edges of said base.

In a preferred embodiment, said bent region is situated at the front of the rail in the upwardly curved intermediate region between the floor and the bulkhead of the vehicle.

The ribs thus efficiently reinforce the most severely stressed region of the rail in a front impact of the vehicle.

In one embodiment, the height of the U-section of the plate, whose upper base comprises said rib or ribs, decreases progressively from the rear to the front of said bent region.

In accordance with another advantageous feature of the invention, the height and width of the rib or ribs are between 10% and 30% of the maximum height of the U-section of said plate.

In accordance with another feature, the flanges of each of the U-section plates are bordered laterally by a horizontal lip which is welded to the floor.

Other features and advantages will also appear throughout the following description.

BRIEF DESCRIPTION OF THE DRAWINGS

The invention is now described with reference to the appended non-restrictive drawings, in which.

DETAILED DESCRIPTION

Figure 1:
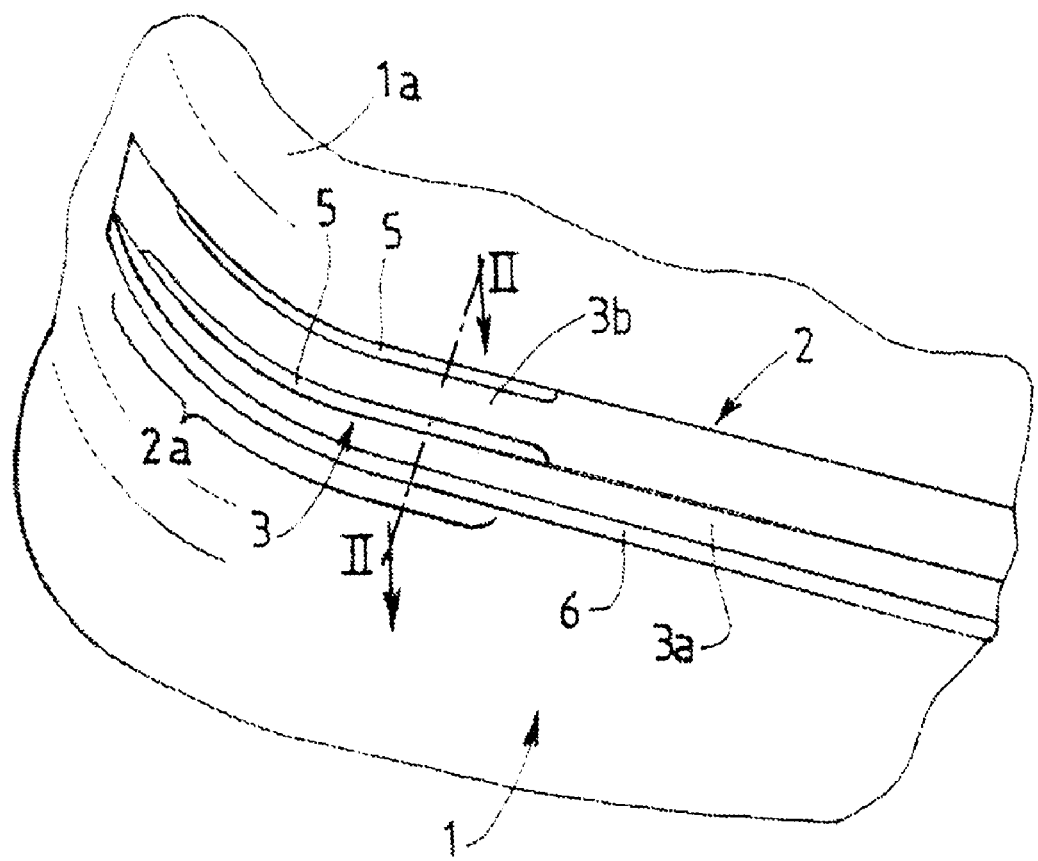
FIG. 1 is a partial view of a vehicle floor according to the invention, comprising a rail, the plate of which is reinforced by ribs formed in a bent region of the rail.

The motor vehicle floor 1, shown partially in FIG. 1, comprises two rails 2, only one of which can be seen in FIG. 1. These are arranged symmetrically with respect to the longitudinal axis of the vehicle.

Each rail 2 consists (see FIG. 2) of two U-section plates 3, 4 superposed to form a hollow body, one 4 of the U-section plates being beneath the floor 1 and the other plate 3 being above the floor 1. The concave side of each rail is thus directed towards the floor 1, and the two rails are situated opposite each other, one above and one below the floor.

The edges of the lateral flanges 3a, 4a of each of the U-section plates 3, 4 are welded to the plate of the floor 1.

The rail 2 shown in FIG. 1 comprises a bent region 2a.

In accordance with the invention, the upper base 3b of the U-section of the plate 3 which lies above the floor 1 has, in the bent region 2a and only in this region, at least one reinforcing rib 5 made by bending the plate 3.

Figure 2:
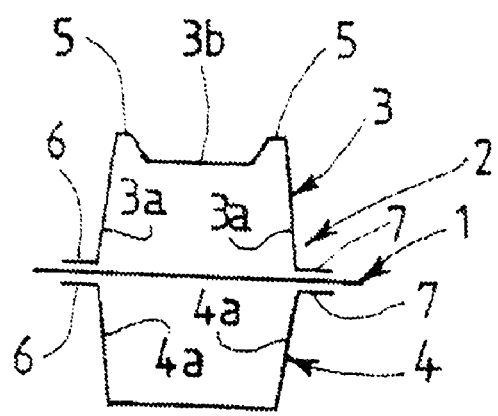
FIG. 2 is a transverse section taken on the plane marker II-II through the rail as shown in FIG. 1

In the example illustrated in FIGS. 1 and 2, the base 3b of the plate 3 has two longitudinal ribs 5, parallel to each other, the two ribs 5 being situated one on each of the two opposite edges of the base 3b. These ribs project from the base 3b of the plate 3 in a direction opposed to the floor.

As can be seen in FIG. 1, the bent region 2a is situated at the front of the rail 2 in the upwardly curved intermediate region 1a between the floor 1 and the bulkhead (not shown) of the vehicle.

FIG. 1 also shows that the height of the U-section of the plate 3, whose upper base 3b contains the ribs 5, decreases progressively from the rear to the front of the bent region 2a, so that the front of the base 3b meets the surface of the floor 1.

To give an example, the height and width of the ribs 5 may be between 10% and 30% of the maximum height of the U-section of the plate 3—that is, to the rear of the bent region 2a.

FIG. 2 shows moreover that the flanges 3a, 4a of each of the U-section plates 3, 4 are bordered laterally by a horizontal lip 6, 7 which is welded to the floor 1.

By limiting the presence of the ribs 5 to the bent region 2a, the invention reduces the thickness of the plate 3 of the rail 2 by around 10%, obtaining a mass reduction of around 8% while providing sufficient strength to the rail in the event of a front impact.

Clearly the invention applies in general to rails made of steel plate, but could also be applied to rails made of aluminum plate.

The invention claimed is:

1. A motor vehicle floor, comprising:
   two rails arranged symmetrically with respect to a longitudinal axis of the vehicle, each rail consisting of two U-section plates superposed to form a hollow body, one of the U-section plates being beneath the floor and the other plate being above the floor and edges of lateral flanges of each of the U-section plates being welded to the floor, each rail comprising a bent region such that an upper base of the U-section of the plate above the floor has, in the bent region and only in the bent region, at least one reinforcing rib.

2. The floor as claimed in claim 1, wherein said base has two longitudinal ribs.

3. The floor as claimed in claim 2, wherein the two ribs are situated one on each of two edges of said base.

4. The floor as claimed in claim 1, wherein said bent region is situated at a front of the rail in an upwardly curved intermediate region between the floor and a bulkhead of the vehicle.

5. The floor as claimed in claim 1, wherein a height of the U-section of the plate, whose upper base comprises said rib or ribs, decreases progressively from a rear to a front of said bent region.

6. The floor as claimed in claim 1, wherein a height and a width of the rib or ribs are between 10% and 30% of a maximum height of the U-section of said plate.

7. The floor as claimed in claim 1, wherein the flanges of each of the U-section plates are bordered laterally by a horizontal lip which is welded to the floor.

* * * * *